(12) United States Patent
Song et al.

(10) Patent No.: US 11,467,594 B2
(45) Date of Patent: Oct. 11, 2022

(54) ROBOTIC NETWORK STRUCTURE AND SENSING SYSTEM SUITABLE FOR UNSTRUCTURED ENVIRONMENT

(71) Applicant: SOUTHERN UNIVERSITY OF SCIENCE AND TECHNOLOGY, Guangdong (CN)

(72) Inventors: Chaoyang Song, Guangdong (CN); Fang Wan, Guangdong (CN)

(73) Assignee: SOUTHERN UNIVERSITY OF SCIENCE AND TECHNOLOGY, Shenzhen (CN)

( * ) Notice: Subject to any disclaimer, the term of this patent is extended or adjusted under 35 U.S.C. 154(b) by 0 days.

(21) Appl. No.: 17/614,457

(22) PCT Filed: Mar. 14, 2020

(86) PCT No.: PCT/CN2020/079403
§ 371 (c)(1),
(2) Date: Nov. 26, 2021

(87) PCT Pub. No.: WO2020/238337
PCT Pub. Date: Dec. 3, 2020

(65) Prior Publication Data
US 2022/0147052 A1    May 12, 2022

(30) Foreign Application Priority Data

May 30, 2019   (CN) .......................... 201910461090.7

(51) Int. Cl.
*G05D 1/02*    (2020.01)
*G01B 11/16*   (2006.01)

(52) U.S. Cl.
CPC .......... *G05D 1/0227* (2013.01); *G01B 11/16* (2013.01)

(58) Field of Classification Search
CPC ....... G05D 1/0227; G01B 11/16; B25J 15/12; B25J 9/06; H04B 10/25891; H04L 41/044; H04L 41/12
(Continued)

(56) References Cited

U.S. PATENT DOCUMENTS

2014/0031982 A1   1/2014   Yamada
2017/0326737 A1   11/2017  Martin et al.

FOREIGN PATENT DOCUMENTS

CN       101875198 A  *  11/2010  ................ B25J 9/08
CN       103264735 A       8/2013
(Continued)

OTHER PUBLICATIONS

K'NEX Industries, Inc. https://cdn.website-editor.net/164e9d3d47c34938a88bb8fd2a4fce23/files/uploaded/P4_7_KNEX_lesson_download.pdf, ; 1992 (Year : 1992).*
(Continued)

*Primary Examiner* — Roy M Punnoose
(74) *Attorney, Agent, or Firm* — Reising Ethington P.C.

(57) ABSTRACT

The invention discloses a robot network structure suitable for an unstructured environment and a sensing system. The robot network structure is a basic unit or superposition of multiple basic units. An upper structure of the basic unit comprises at least two first nodes, and a lower structure comprises at least two second nodes which are not coplanar with the at least two first nodes. All the first nodes and all the second nodes form a three-dimensional network structure through connecting rods. According to the invention, when a lateral acting force from the external environment is received, the connecting rod of the three-dimensional network structure undergoes concave deformation in a space to adapt to a geometric structure of the external environment, thereby enabling a robot to realize physical interaction in the
(Continued)

unstructured environment; and on top of this, a hollow structure of the connecting rod may be directly used as an optical path or a single or multiple optical fiber loops may be embedded therein, and the physical deformation of the connecting rod is detected by measuring the change of light flux, so that the robot may realize the physical perception of the unstructured environment during interaction.

10 Claims, 5 Drawing Sheets

(58) Field of Classification Search
USPC .......................................................... 356/614
See application file for complete search history.

(56) References Cited

FOREIGN PATENT DOCUMENTS

| CN | 103533553 | A | | 1/2014 | |
|----|-----------|---|---|--------|---|
| CN | 103568008 | A | | 2/2014 | |
| CN | 103754282 | A | | 4/2014 | |
| CN | 203888924 | U | | 10/2014 | |
| CN | 104867381 | A | * | 8/2015 | ............. G09B 23/04 |
| CN | 207157327 | U | | 3/2018 | |
| CN | 208805212 | U | * | 4/2019 | ............... G01D 5/32 |
| CN | 110174069 | A | | 8/2019 | |
| CN | 110174070 | A | | 8/2019 | |
| CN | 110174071 | A | | 8/2019 | |
| JP | 2017209781 | A | | 11/2017 | |
| WO | WO-9622859 | A1 | * | 8/1996 | ............... B25J 9/08 |

OTHER PUBLICATIONS

K'NEX Industries, Inc. https://www.reddit.com/r/toys/comments/q18wgp/new_building_toy_beam_and_hub_system_like_knex/; 1992 (Year: 1992).*
International Search Report corresponding to International Application No. PCT/CN2020/079403, dated Mar. 12, 2020, 8 pages.
Written Opinion corresponding to International Application No. PCT/CN2020/079403, dated Jun. 15, 2020, 6 pages.
International Preliminary Report on Patentability for Application No. PCT/CN2020/079403, dated Sep. 28, 2021, 107 pages.
1st Chinese Office Actions corresponding to Chinese Application No. 201910461090, dated Sep. 15, 2020, 8 pages.
2nd Chinese Office Actions corresponding to Chinese Application No. 201910461090, dated Mar. 10, 2021, 9 pages.
Rejection notice corresponding to Chinese Application No. 201910461090, dated Jun. 25, 2021, 11 pages.

* cited by examiner

ROBOTIC NETWORK STRUCTURE AND SENSING SYSTEM SUITABLE FOR UNSTRUCTURED ENVIRONMENT

BACKGROUND OF THE INVENTION

1. Technical Field

The invention belongs to the technical field of robot design, and relates to a self-adaptive universal space network robot and a sensing system, in particular to a robot network structure suitable for physical interaction in an unstructured environment and a sensing system.

2. Description of Related Art

Rigid materials are often used for structural design of existing robots, and a mature design method has been formed in dealing with structured environment problems, such as industrial robots. However, when dealing with more extensive unstructured environment interaction, this design method has great limitations, because complex mechanical structures, transmission parts, driving parts, etc. are often needed to achieve complex motion functions, and in this process, the adaptability of robot structures has become an important design issue.

Generally, robots with high environmental adaptability may realize various complex functions in a wider range of application scenarios, especially in unstructured environments, by means of a single structure or only a few changes, which is an important manifestation of robot adaptability. For example, in the design of mechanical claws of robots, an ultimate design method is to imitate the flexible structure of human hands, but to achieve similar functions, dozens of drivers and parts like human hand muscles need to be introduced and complex motion control is required (such as the artificial pneumatic muscle driven manipulator produced by Shadow Robotics). Such robots are often complex in structure and expensive in cost. Self-adaptive manipulators are expected to be suitable for stable grasping of objects with different geometric shapes and more complex physical environments (such as underwater and dust-free environments) with fewer drivers (such as only one driver) and fewer parts. Another example is that in the design of mobile robots, robots are often expected to move efficiently not only on a flat ground through a wheeled structure, but also in complex and rugged terrain environments. Self-adaptive mobile robots need to be able to move efficiently in different terrains (such as bumpy and uneven surfaces) and different environments (such as land, swamp, sand and underwater). Biped robots may effectively solve the movement problem in complex terrains (such as Boston Dynamics BigDog), but complex mechanical structures and specially designed drivers are often needed to cope with complex terrains through advanced sensing and control. Self-adaptive biped robots may realize adaptive gaits in complex environments with a relatively simple biped structure and as few drivers as possible. Another example is underwater mechanical arms. The fragile underwater ecological environment including coral needs to be protected in underwater operation. For traditional mechanical arms, complex structure, waterproof and sensing design is required to avoid collision in the underwater environment during the operation of mechanical arms, so as to produce as little impact as possible. Self-adaptive underwater mechanical arms need to be able to reduce the damage to the physical environment to the greatest extent through their own structural adaptability even if collision occurs. In order to solve the above problems, in the prior art, more complex mechanical structures, driving modes, sensing devices and control methods are often integrated to realize robot design which may cope with the above difficulties. Such design often has many problems, such as complex structure, high cost, numerous parts, narrow space, complex control, difficult protection under special circumstances, etc. It is still a great challenge in the field of robot design to propose a universal self-adaptive robot design method to meet the special application requirements in unstructured environments.

BRIEF SUMMARY OF THE INVENTION

In view of the above shortcomings and problems, the invention provides a robot network structure suitable for physical interaction in an unstructured environment and a sensing system.

A first object of the invention is to provide a robot network structure suitable for an unstructured environment, and the robot network structure is a basic unit or superposition of multiple basic units;

the basic unit comprises an upper structure and a lower structure;

the upper structure comprises at least two first nodes;

the lower structure comprises at least two second nodes which are not coplanar with the at least two first nodes; and all the first nodes and all the second nodes form a three-dimensional network structure through connecting rods, and the connecting rods are connected between the two first nodes, the two second nodes or between the first nodes and the second nodes.

As a further improvement of the invention, the connecting rod is a hollow flexible rod.

As a further improvement of the invention, any one of the first nodes is connected with the first node closest thereto through the connecting rods;

any one of the second nodes is connected with the second node closest thereto through the connecting rods; and on the basis of the proximity principle, one or more of the first nodes and one or more of the second nodes are connected through the connecting rods.

As a further improvement of the invention, any one of the first nodes and one or more first nodes not connected therewith are connected through the connecting rods.

As a further improvement of the invention, any one of the second nodes and one or more second nodes not connected therewith are connected through the connecting rods.

As a further improvement of the invention, any one of the first nodes and one or more second nodes not connected therewith are connected through the connecting rods.

A second object of the invention is to provide a sensing system of a robot network structure, comprising a light source device, a photosensitive device and an optical signal processor;

wherein the robot network structure is provided with an optical path entrance and an optical path exit, the light source device and the photosensitive device are connected with the optical signal processor, the light source device is arranged at the optical path entrance, and the photosensitive device is arranged at the optical path exit;

light emitted by the light source device enters a hollow channel of the connecting rod through the optical path entrance and is transmitted to the photosensitive device through the optical path exit; and the optical signal processor processes optical signals of the light source device and the photosensitive device, and converts the optical signals into deformation signals of the robot network structure to realize the sensing function.

A third object of the invention is to provide a sensing system of a robot network structure, comprising a light source device, a photosensitive device and an optical signal processor;

wherein the robot network structure is provided with an optical path entrance and an optical path exit, and a single or multiple optical fiber loops are embedded in a hollow channel of the connecting rod;

the light source device and the photosensitive device are connected with the optical signal processor, the light source device is arranged at the optical path entrance, and the photosensitive device is arranged at the optical path exit;

light emitted by the light source device enters the optical fiber loop through the optical path entrance and is transmitted to the photosensitive device through the optical path exit; and the optical signal processor processes optical signals of the light source device and the photosensitive device, and converts the optical signals into deformation signals of the robot network structure to realize the sensing function.

Compared with the prior art, the invention has the beneficial effects that:

According to the invention, a spatial three-dimensional network structure is formed by orderly combining the nodes in a space through the connecting rods based on the positions of the nodes; when subjected to a lateral acting force from the external environment, the connecting rod of the three-dimensional network structure undergoes concave deformation in the space to adapt to a geometric structure of the external environment, thereby enabling a robot to realize physical interaction in the unstructured environment; and on top of this, a hollow structure of the connecting rod may be directly used as an optical path or a single or multiple optical fiber loops may be embedded therein, and the physical deformation of the connecting rod is detected by measuring the change of light flux, so that the robot may realize the physical perception of the unstructured environment during interaction.

Figure 1:
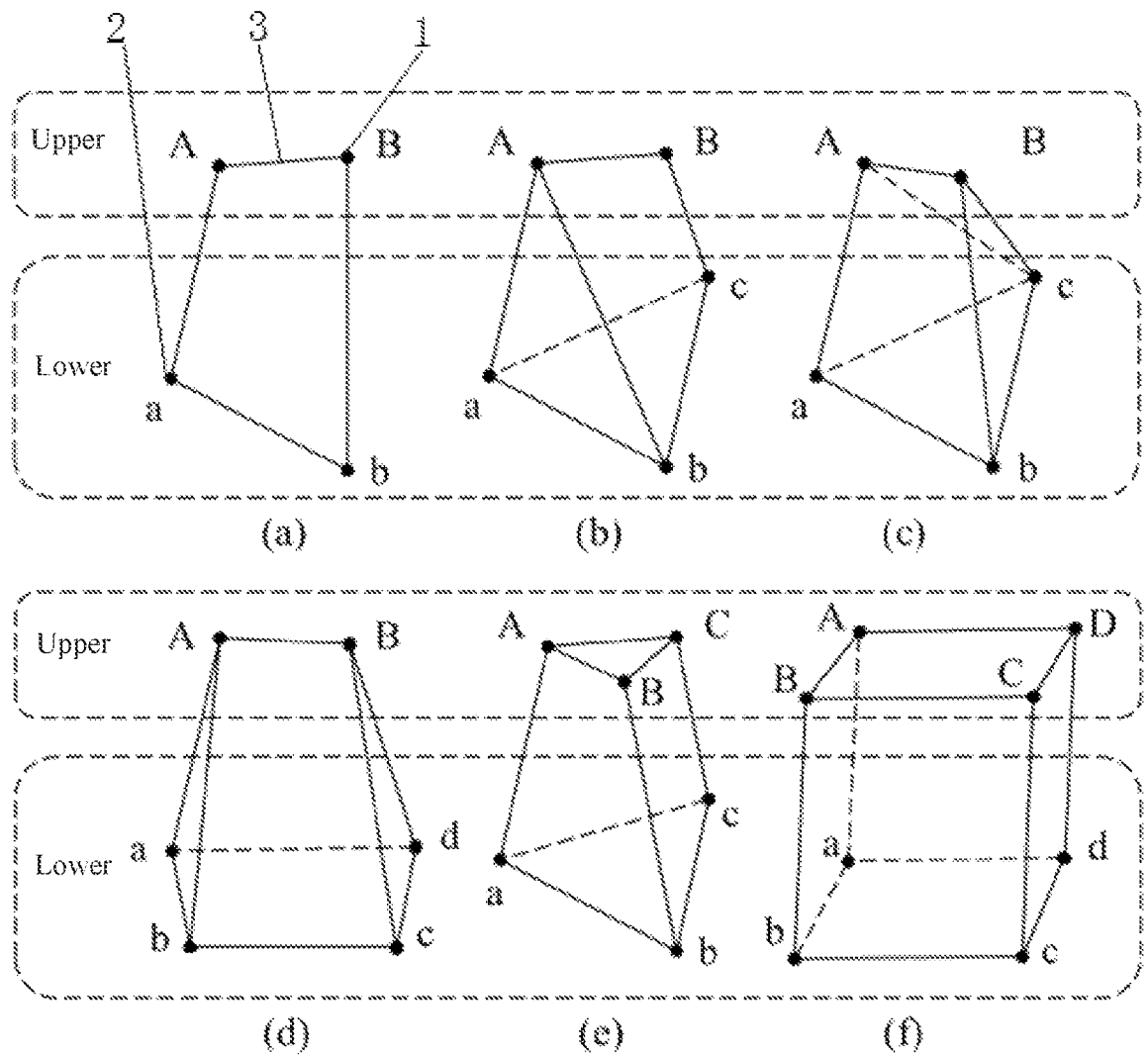
FIG. 1 is a structural diagram of a basic unit of a robot network structure disclosed in an embodiment of the invention.

1. first node; 2. second node; 3. connecting rod; 4. light source device; 5. photosensitive device; 6. optical signal processor; 7. optical path entrance; 8. optical path exit; 9. optical path opening into which side connecting rod may be introduced; 10. deformation signal.

DETAILED DESCRIPTION OF THE INVENTION

In order to make the purpose, technical solution and advantages of the embodiments of the invention clearer, the technical solution in the embodiments of the invention will be described clearly and completely with reference to the drawings in the embodiments of the invention. Obviously, the described embodiments are part of the embodiments of the invention, not all of them. Based on the embodiments of the invention, all other embodiments obtained by those of ordinary skill in the art without making creative labor belong to the scope of protection of the invention.

In the description of the invention, it should be noted that the orientation or position relationship indicated by the terms "center", "upper", "lower", "left", "right", "vertical", "horizontal", "inner" and "outer" are based on the orientation or position relationship shown in the drawings, only for convenience of describing the invention and simplifying the description, and do not indicate or imply that the indicated device or element must have a specific orientation, or be constructed and operated in a specific orientation, and therefore cannot be understood as a limitation of the invention. In addition, the terms "first", "second" and "third" are only used for descriptive purposes and cannot be understood as indicating or implying relative importance.

In the description of the invention, it should be also noted that the terms "install" and "connect" should be understood in a broad sense unless otherwise specified and defined. For example, it can be fixed connection, detachable connection or integrated connection; it can be mechanical connection or electric connection; and it can be direct connection, indirect connection through intermediate media or internal communication of two elements. For those of ordinary skill in the art, the specific meaning of the above terms in the invention can be understood in specific situations.

The purpose of the invention is to realize self-adaptive interaction and perception of an unstructured environment in a relatively limited structural space during physical interaction of robot equipment.

In order to achieve the above purpose, the invention carries out research from the theoretical level, the method level, the processing level and the application level in sequence, including:

at the theoretical level, how to realize complex and intelligent environment interaction and intelligent perception in a limited physical space with the help of kinematics and material characteristics of a spatial mechanism on the basis of highly integrated sensing, driving, electronics, modeling and other technical means in the process of mechanical structure design;

at the method level, how to optimize a mechanical structure, design a relatively simple mechanical configuration with general functions, and realize a robot configuration design which may realize more complex or advanced functions with fewer mechanical parts;

at the processing level, how to reduce the processing cost and process difficulty and realize a robot configuration which may realize more complex or advanced functions with the help of processing. technology and material characteristics; and at the application level, how to use a single mechanical configuration design as a carrier to realize interactive application between a robot and an unstructured physical environment in various different scenes.

To achieve the above purpose, the design basis of a robot network structure suitable for physical interaction in an unstructured environment is as follows:

according to the classical structural mechanics theory, when any structural member is subjected to a lateral actin; force from the external environment, due to the material elasticity of the member itself, elastic deformation will occur along the stressed direction, and at the same time, both ends of the member will have a deformation trend towards the stressed direction, and the external environment or external object applying the acting force will be subjected to a counter-acting force from the member.

To this end, the invention provides a robot network structure suitable for physical interaction in an unstructured environment and a sensing system. According to the invention, a spatial three-dimensional network structure is formed by orderly combining upper nodes and lower nodes in a space through connecting rods based on the positions of the nodes; when subjected to a lateral acting force from the external environment, the connecting rod of the three-dimensional network structure undergoes concave deformation in the space to adapt to a geometric structure of the external environment, thereby enabling a robot to realize physical interaction in the unstructured environment; and on top of this, a hollow structure of the connecting rod may be directly used as an optical path or a single or multiple optical fiber loops may be embedded therein, and the physical deformation of the connecting rod is detected by measuring the change of light flux with an optical signal processor, so that the robot may realize the physical perception of the unstructured environment during interaction.

Among them, optical fiber conduction means that light is transmitted in the fiber by the principle of total internal reflection, with low transmission loss. The characteristics of long-distance and fast transmission of information. When it is applied to sensors, this principle is also used. By processing the optical path or fiber, the optical fiber loses the light intensity during the propagation process. When the lost light intensity corresponds to the predicted physical quantity, the sensing of the physical quantity to be solved is realized.

Using the principle of total internal reflection of the optical fiber in transmission, the optical path or the refractive index of the inner wall is changed, and the light intensity signal at the receiving end is detected with the deformation of the software structure. The sensor principle that changes to obtain perception is a very common processing method. In the design of the present invention, the main deformation of the network structure of the sent invention is the bending deformation of the connecting rod. For input from different directions, the degree of bending of the connecting rod is also different. This makes it possible to distinguish the pressure input in different directions.

Figure 2:
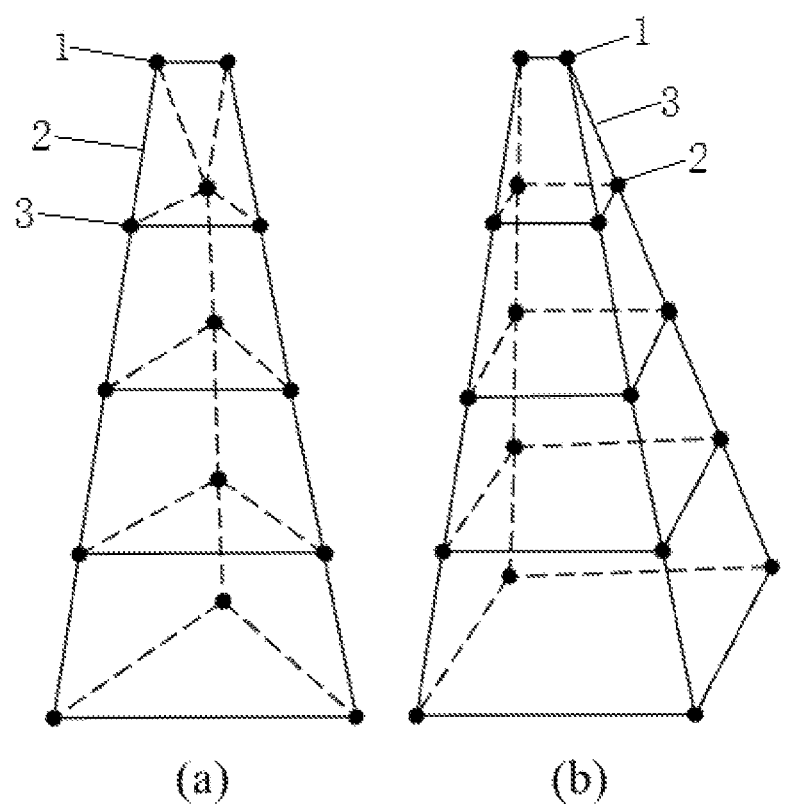
FIG. 2 is a structural diagram of superposition of multiple basic units of a robot network structure disclosed in an embodiment of the invention.

The invention will be described in detail with reference to the accompanying drawings:

As shown in FIG. 2, the invention provides a robot network structure suitable for an unstructured environment. The robot network structure is a basic unit or superposition of multiple basic units, and the network structure consisting of the basic units is shown in FIG. 1.

As shown in FIG. 1, the basic unit of the invention comprises an upper structure and a lower structure;

the upper structure comprises at least two first nodes 1;

the lower structure comprises at least two second nodes 2 which are not coplanar with the at least two first nodes 1; and all the first nodes 1 and all the second nodes 2 form a three-dimensional network structure through the connecting rods 3, the connecting rod 3 is a hollow flexible rod (i. e., an elastic or superelastic material with high Young's modulus and deformation ratio), other solid rods meeting the requirements may also be adopted, and the hollow flexible rod is preferred; when a solid rod is adopted, a channel for an optical path to pass through may be arranged on the solid rod; and the connecting rods 3 are connected between two first nodes 1, two second nodes 2 or between the first nodes 1 and the second nodes 2. In this invention, all the nodes (including the first nodes and the second nodes) are connected into a whole, the specific connection mode between the first nodes 1 and the second nodes 2 is not limited, and the specific connection mode between the first nodes 1 and the second node 2s may be designed according to different requirements.

Preferably, in the upper structure of the invention, any one of the first nodes is connected with the first node closest thereto through the connecting rods; in the lower structure, any one of the second nodes is connected with the second node closest thereto through the connecting rods; and in the upper and lower structures, on the basis of the proximity principle, one or more of the first nodes and one or more of the second nodes are connected through the connecting rods.

More preferably, according to the actual design requirements of different scenes, in the upper structure, any one of the first nodes and one or more first nodes not connected therewith are connected through the connecting rods; in the lower structure, any one of the second nodes and one or more second nodes not connected therewith are connected through the connecting rods; and in the upper and lower structures, any one of the first nodes and one or more second nodes not connected therewith are connected through the connecting rods.

More preferably, it should be pointed out that such basic structural unit may also be regarded as a special case of the aforementioned basic structural unit, that is, a combination of two basic units with the same lower node configuration but different single upper node configurations. In this case, the structure may be simplified by connecting the single upper nodes of the two basic units and removing other connecting rods connected with the upper nodes but with greater lengths, so as to avoid a structure where the connecting rods are staggered.

As shown in FIG. 1, the invention shows basic unit structures with two first nodes (A/B) in the upper layer and two second nodes (a/b) in the lower layer, two first nodes (A/B) in the upper layer and three second nodes (a/b/c) the lower layer, two first nodes (A/B) in the upper layer and four second nodes (b/c/d) in the lower layer, three first nodes (A/B/C) in the upper layer and three second nodes (a/b/c) in the lower layer, and four first nodes (A/B/C/D) in the upper layer and four second nodes (a/b/c/d) in the lower layer.

For the [quadrilateral] ABab configuration as shown in FIG. 1a, it can be concluded by the analysis method similar to the first specific example mentioned above that the basic structural unit may achieve self-adaptive coating and motion stabilization effects on the external environment such as an article X.

The [double trilateral and double quadrilateral] ABabc configuration shown in FIG. 1b may be equivalent to a composite structural unit formed by superposition of two [tetrahedral] basic structural units Aabc and Babc through abc in the lower layer, and then the two nodes A and B in the upper layer are connected; and since A is close to a and b in space, while B is only close to c in space, the three connecting rods Ac, ba and Bb may be removed to simplify the structure and avoid a structure where the connecting rods are staggered. It can be concluded by similar analysis that the basic structural unit may achieve self-adaptive coating and motion stabilization effects on the external environment such as the article X.

The [single quadrilateral and four trilateral] ABabc configuration shown in FIG. 1c may be equivalent to a composite structural unit formed by superposition of two [tetrahedral] basic structural units Aabc and Babc through abc in the lower layer, but the spatial distances of Ac and Bc are basically equal and the spatial distances of Aa and Bb are also basically equal, so in this case, the structure may be simplified by removing Ab and Ba to avoid a structure where the connecting rods are staggered. The configuration may also be regarded as a pyramid-shaped basic structural unit with c as the first layer and ABba as the second layer. It can be concluded by similar analysis that the basic structural unit may achieve self-adaptive coating and motion stabilization effects on the external environment such as the article X.

The [three quadrilateral and double trilateral] ABabcd configuration shown in FIG. 1d may be equivalent to a composite structural unit formed by superposition of two [pyramid type] basic structural units Aabcd and Babcd through abcd in the lower layer, but the spatial distances of Aa and Ab are basically equal and the spatial distances of Bc and Bd are also basically equal, so in this case, the structure may be simplified by removing Ac, Ad, Ba and Bb to avoid a structure where the connecting rods are staggered. It can be concluded by similar analysis that the basic structural unit may achieve self-adaptive coating and motion stabilization effects on the external environment such as the article X.

In other cases, other basic network structure units may be obtained in a similar fashion according to the above analysis.

Another special case of such basic structural unit is that when the upper layer and the lower layer have the same number of connection nodes, for each layer, it only needs to sequentially connect adjacent nodes through the connecting rods to form a single closed-loop structure, then corresponding nodes in the two layers are sequentially connected through the connecting rods to form a three-dimensional network structure, and the nodes in different layers may not be coplanar.

For example, in the [double-layer trilateral] ABCabc configuration shown in FIG. 1e, the upper layer and the lower layer each have three connection nodes; and in the [double-layer quadrilateral] ABCDabcd configuration shown in FIG. 1f, the upper layer and the lower layer each have four connection nodes.

As shown in FIG. 2, on the basis of the above-mentioned basic unit, the robot space network structure designed by the invention may be formed by the combination and stacking of the above-mentioned multiple basic structures, each layer of basic structure units may adapt to the geometric dimensions of different positions of the article X through concave deformation, and through the superposition of the self-adaptability and motion stabilization effects of each layer of basic structures, including the self-adaptive coating and motion stabilization effects generated by torsional deformation of the network structure, the self-adaptive coating and motion stabilization effects of the overall spatial network structure on the external environment are comprehensively improved. A remarkable feature of the robot body spatial network structure of the invention is that self-adaptation to the geometric structure of the external environment and motion stabilization may be realized from any lateral angle.

A [multi-layer composite] structure as shown in FIG. 2a is composed of [single quadrilateral and three trilateral] basic structural units at the top and multiple double-layer [trilateral] basic structural units at the bottom.

Another [multi-layer composite] structure as shown in FIG. 2b is composed of [three quadrilateral and double trilateral] basic structural units at the top and multiple double-layer [quadrilateral] basic structural units at the bottom.

According to the actual needs of different scenes, corresponding structural design may be carried out according to the design method described in this invention, to realize the structural adaptability and motion stabilization effects of the robot body to the external environment. Diversified robot structures may be realized by this method.

Preferably, according to the actual design requirements of different scenes, the geometric shape of each connecting rod may be a general straight line or a complex curve with some special design, and the cross-sectional shape of each connecting rod may be round, square or any other cross-sectional shape.

Preferably, each connecting rod is made of a material with certain elasticity, that is, it may produce detectable elastic deformation under the action of an external force, and any connecting rod may be of a hollow structure, so as to realize the perception of elastic deformation of the rod by detecting the light flux in the rod.

Preferably, according to the actual design needs of different scenes, the connection between the connecting rods at the connection nodes may be realized through general structural fixation (no degree of freedom, that is, there is no freedom of relative motion between the connecting rods), hinge connection (one degree of freedom, that is, there is a degree of freedom of relative rotation between the connecting rods), ball hinge connection (three degrees of freedom, that is, there are two degrees of freedom of relative rotation plus one degree of freedom of rotation around the axis between the connecting rods), etc.

The invention may adopt a flexible rod with an internal optical path (i. e., an elastic or superelastic material with high Young's modulus and deformation ratio), and when the rod is deformed, the deformation of the rod may be measured by measuring the change of light flux in the optical path or a light transmission medium such as optical fibers in the optical path, thereby realizing the perception of the physical environment of the whole robot network structure during interaction.

Figure 3:
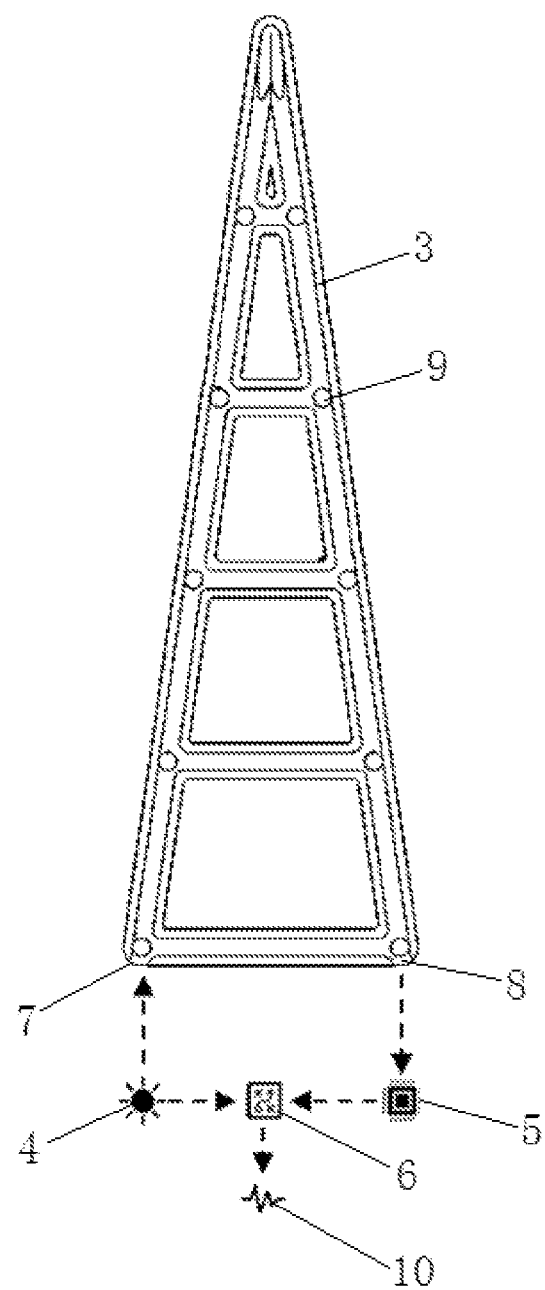
FIG. 3 is a side sectional view of a sensing system of a robot network structure disclosed in an embodiment of the invention.

Specifically, as shown in FIG. 3 which is a sectional view of a side triangle in FIG. 2, the invention provides a sensing system of a robot network structure, comprising a light source device 4, a photosensitive device 5 and an optical signal processor 6, wherein the robot network structure is provided with an optical path entrance 7 and an optical path exit 8, an optical path opening 9 into which a side connecting rod may be introduced is arranged at a connecting point, the light source device 4 and the photosensitive device 5 are connected with the optical signal processor 6, the light source device 4 is arranged at the optical path entrance 7, and the photosensitive device 5 is arranged at the optical path exit 8.

In use, light emitted by the light source device 4 enters the hollow channel of the connecting rod 3 through the optical path entrance 7 and is transmitted to the photosensitive device 5 through the optical path exit 8, and the optical signal processor 6 processes optical signals of the light source device 4 and the photosensitive device 5, and converts the optical signals into deformation signals of the robot network structure to realize the sensing function.

Further, the specific direction of the optical path of the sensing system of the invention may be specifically designed according to actual requirements, the optical path entrance and exit are arranged at the bottom and connected to a robot base, the light source device may be a light emitting diode, and the photosensitive device may be a photosensitive sensor.

The invention also provides another sensing system of a robot network structure, comprising a light source device 4, a photosensitive device 5 and an optical signal processor 6, wherein the robot network structure is provided with an optical path entrance 7 and an optical path exit 8, and a single or multiple optical fiber loops are embedded in a hollow channel of the connecting rod 3 an optical path opening 9 into which a side connecting rod may be introduced is arranged at a connecting point the light source device 4 and the photosensitive device 5 are connected. with the optical signal processor 6, the light source device 4 is arranged at the optical path entrance 7, and the photosensitive device 5 is arranged at the optical path exit 8.

In use, light emitted by the light source device 4 enters the optical fiber loops through the optical path entrance 7 and is transmitted to the photosensitive device 5 through the optical path exit 8, and the optical signal processor 6 processes optical signals of the light source device 4 and the photosensitive device 5, and converts the optical signals into deformation signals of the robot network structure to realize the sensing function.

Further, the specific direction of the optical path of the sensing system of the invention may be specifically designed according to actual requirements, the optical path entrance and exit are arranged at the bottom and connected to a robot base, the light source device may be a light emitting diode, and the photosensitive device may be a photosensitive sensor.

According to the invention, a robot may be formed based on the robot network structure, the sensing system and the base, and the light source device 4, the photosensitive device 5 and the optical signal processor 6 may be installed on the base. The above-mentioned robot structure may generate self-adaptive deformation to the unstructured geometric features of the external physical environment to form geometric coating without any electronic components such as extra drivers and sensors, and at the same time, due to its own network structure features, the self-adaptive motion stabilization effect may be generated in interaction. Compared with the traditional robot structure design, the robot has the advantages of simple structure, fewer parts, flexible design, no need of extra drivers, sufficient design space, flexible application scenarios, etc. The adaptability in deep sea, deep space, deep ground and other extremely harsh environments is remarkably improved.

EMBODIMENTS

The self-adaptive process of the basic unit of the invention is as follows:

The [double trilateral and double quadrilateral] ABabc configuration shown in FIG. 1*b* is taken as an example, which may be equivalent to a composite structural unit formed by superposition of two [tetrahedral] basic structural units Aabc and Babc through abc in the lower layer, and then the two nodes A and B on the upper layer are connected.

Therefore, the invention takes the [tetrahedral] basic structural unit Aabc as an example to explain the self-adaptive process as follows:

When the [tetrahedral] basic structural unit Aabc is subjected to an acting force from the external environment, that is, the article X with a certain three-dimensional geometry size, the edges in contact with the article X produce different degrees of elastic deformation, forming spatial coating on the three-dimensional geometry size of the article X, so as to realize self-adaptability to the geometry shape.

Figure 4:
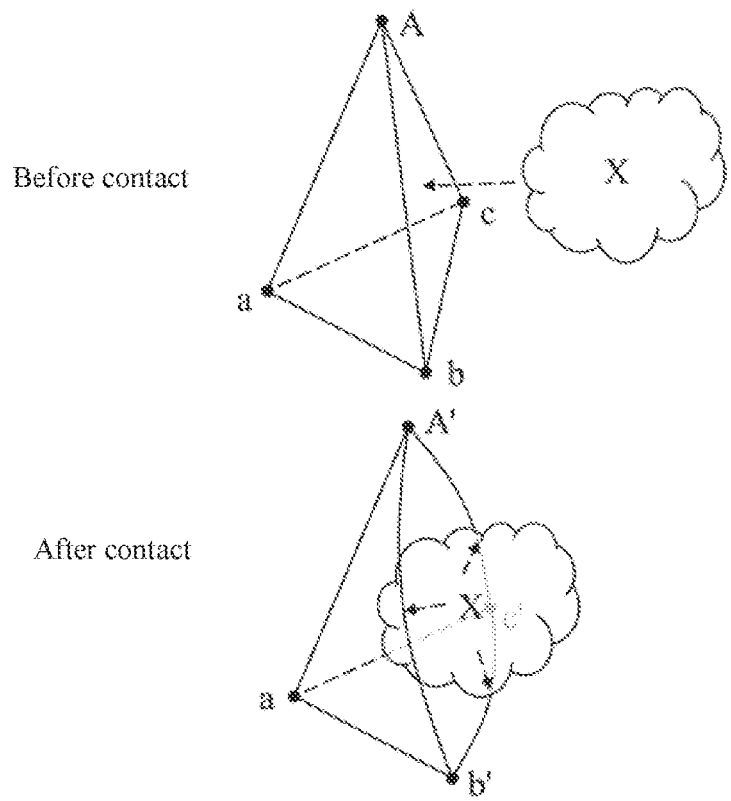
FIG. 4 is a diagram of self-adaptive deformation of an article X before and after making contact with a basic unit according to an embodiment of the invention.

As shown in FIG. 4, the external environment, that is, the article X with a certain spatial geometry is in a blank area in the middle of a tetrahedral triangle Abc;

before contact, the relative resultant motion direction of the article X and the [tetrahedral] basic structural unit is indicated by the dotted arrow, which points to the blank area in the middle of the triangle Abc of the [tetrahedral] basic structural unit; and after contact, the article X comes into contact with the triangle Abc of the [tetrahedral] basic structural unit, the triangle Abc produces corresponding elastic deformation, that is to say, the original connection nodes A, b and c respectively generate a certain amount of displacement inward to A', b' and c', and the three rods realize the adaptability to the geometric dimension of the article X through elastic deformation.

Figure 5:
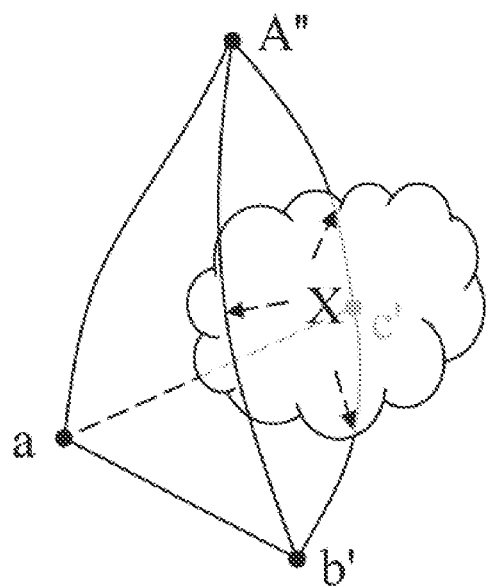
FIG. 5 is a diagram after self-adaptive deformation of an article X by a basic unit in FIG. 4.

As shown in FIG. 5, after contact as shown in FIG. 4, the triangle A'bc may rotate around the rod A'a because the acting forces represented by the dotted arrows are uneven and the point A' is additionally restricted by the rod A'a, resulting in the torsional movement of the whole [tetrahedral] basic structural unit, and the resulting overall deformation further enhances the adaptability to the geometric structure of the article X. When the forces indicated by the three arrows in the figure are instantaneously equal, the effect of stabilizing the movement of the article X is realized.

Figure 6:
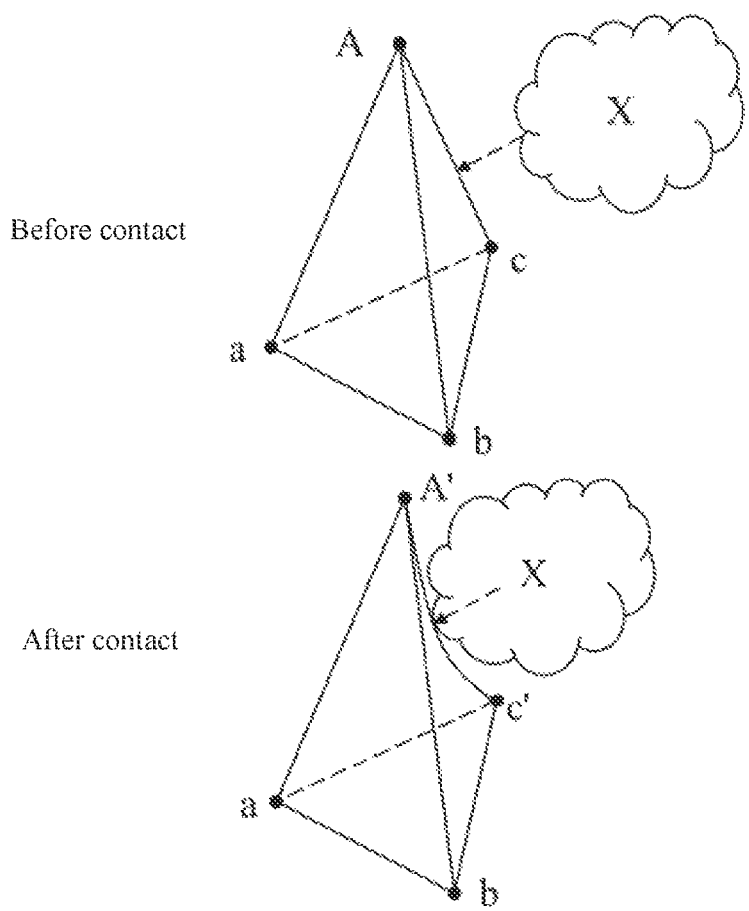
FIG. 6 is a diagram of self-adaptive deformation of an article X before and after making contact with a basic unit according to another embodiment of the invention.

As shown in FIG. 6, the external environment, that is, the article X with a certain spatial geometrical shape is almost uniformly distributed in the triangle Abc and the triangle Aac in the [tetrahedral] structure.

Before contact, the relative resultant motion direction of the article X and the [tetrahedral] basic structural unit is indicated by the dotted arrow, and at this point, the article X is almost uniformly distributed in the triangle Abc and the triangle Aac relative to the [tetrahedral] basic structural unit, that is, the dotted arrow mainly points to the direction of the rod Ac; and after contact, the article X comes into contact with the rod Ac of the [tetrahedral] basic structural unit, the rod Ac produces corresponding elastic deformation, that is, the article X mainly comes into contact with the rod Ac, so that the rod Ac is elastically deformed to form adaptability to the geometric dimension of the article X, and the original connection nodes A and c respectively generate a certain amount of displacement inward to A' and c'.

Besides, based on the principle of FIG. 5, when the acting force of the article X on different connecting rods of the configuration is uneven, the side on which the force is applied will be twisted, so that the whole [tetrahedral] configuration will also be twisted, and the self-adaptive geometric coating of the article X will be further strengthened, thereby realizing the effect of stabilizing the movement of the article X.

Because the basic unit [double trilateral and double quadrilateral] ABabc of the invention is formed by superposition of two [tetrahedral] basic structural units Aabc and Babc, the [double trilateral and double quadrilateral] configuration ABabc shown in FIG. 1b may achieve self-adaptive coating and motion stabilization effects on the external environment such as the article X by similar methods as described above.

Further, the robot network structure of the invention is formed by superposition of multiple basic units, and the robot network structure shown in FIG. 2 may achieve self-adaptive coating and motion stabilization effects on the external environment such as the article X by similar methods as described above.

The above embodiments are only preferred ones of the invention, and are not used to limit the invention. For those skilled in the art, the invention may be modified and varied. Any modification, equivalent substitution, improvement, etc. made within the spirit and principle of the invention shall be included in the protection scope of the invention.

What is claimed is:

1. A robot network structure suitable for an unstructured environment, comprising: a basic unit or superposition of multiple basic units; wherein:
    each basic unit comprises an upper structure, a lower structure, and connecting rods;
    the upper structure comprises at least two first nodes;
    the lower structure comprises at least two second nodes which are not coplanar with the at least two first nodes; and
    all the first nodes and all the second nodes form a three-dimensional network structure through the connecting rods, and the connecting rods are connected between the two first nodes, the two second nodes, or between the first nodes and the second nodes;
    wherein:
    the three-dimensional network structure is a spatial three-dimensional network structure formed by combining the nodes in a space through the connecting rods based on the positions of the nodes;
    the connecting rods are flexible rods;
    when subjected to a lateral acting force from an external environment, each connecting rod of the three-dimensional network structure undergoes elastic deformation to self-adapt to the external environment;
    each flexible rod has an internal optical path;
    a light source located at an optical path entrance provides light in the internal optical path;
    a photosensor located at an optical path exit detects light flux in the internal optical path; and
    the deformation of each rod is measured by measuring a change of light flux in the optical path using an optical signal processor that converts optical signals of the photosensor into deformation signals.

2. The robot network structure according to claim 1, wherein each connecting rod is a hollow flexible rod.

3. The robot network structure according to claim 1, wherein any one of the first nodes is connected with the first node closest thereto through the connecting rods;
    any one of the second nodes is connected with the second node closest thereto through the connecting rods; and
    on the basis of the proximity principle, one or more of the first nodes and one or more of the second nodes are connected through the connecting rods.

4. The robot network structure according to claim 3, wherein any one of the first nodes and one or more first nodes not connected therewith are connected through the connecting rods.

5. The robot network structure according to claim 3, wherein any one of the second nodes and one or more second nodes not connected therewith are connected through the connecting rods.

6. The robot network structure according to claim 3, wherein any one of the first nodes and one or more second nodes not connected therewith are connected through the connecting rods.

7. The robot network structure according to claim 1, wherein:
    the internal optical path comprises a hollow channel;
    the light source and the photosensor are connected with the optical signal processor;
    light emitted by the light source enters the hollow channel of the connecting rod through the optical path entrance and is transmitted to the photosensor through the optical path exit; and
    the optical signal processor processes optical signals of the light source and the photosensor, and converts the optical signals into deformation signals of the robot network structure to realize the sensing function.

8. The robot network structure according to claim 1, wherein:
    the internal optical path comprises a single or multiple optical fiber loops embedded in a hollow channel of the connecting rod;
    the light source and the photosensor are connected with the optical signal processor;
    light emitted by the light source enters the optical fiber loop through the optical path entrance and is transmitted to the photosensor through the optical path exit; and
    the optical signal processor processes optical signals of the light source and the photosensor, and converts the optical signals into deformation signals of the robot network structure to realize the sensing function.

9. A robot network structure suitable for an unstructured environment, comprising: a basic unit or superposition of multiple basic units; wherein:
    each basic unit comprises an upper structure, a lower structure, and connecting rods;
    the upper structure comprises at least two first nodes;
    the lower structure comprises at least two second nodes which are not coplanar with the at least two first nodes; and
    all the first nodes and all the second nodes form a three-dimensional network structure through the connecting rods, and the connecting rods are connected between the two first nodes, the two second nodes, or between the first nodes and the second nodes;
    the robot network structure further comprising: a sensing system;
    wherein the sensing system comprises a light source, a photosensor, and an optical signal processor;
    wherein the robot network structure is provided with an optical path entrance and an optical path exit, the light source and the photosensor are connected with the optical signal processor, the light source is arranged at the optical path entrance, and the photosensor is arranged at the optical path exit;
    light emitted by the light source enters a hollow channel of the connecting rod through the optical path entrance and is transmitted to the photosensor through the optical path exit; and
    the optical signal processor processes optical signals of the light source and the photosensor, and converts the optical signals into deformation signals of the robot network structure to realize the sensing function.

10. A robot network structure suitable for an unstructured environment, comprising: a basic unit or superposition of multiple basic units; wherein:

each basic unit comprises an upper structure, a lower structure, and connecting rods;
the upper structure comprises at least two first nodes;
the lower structure comprises at least two second nodes which are not coplanar with the at least two first nodes; and
all the first nodes and all the second nodes form a three-dimensional network structure through the connecting rods, and the connecting rods are connected between the two first nodes, the two second nodes, or between the first nodes and the second nodes;
the robot network structure further comprising: a sensing system;
wherein the sensing system comprises a light source, a photosensor, and an optical signal processor;
wherein the robot network structure is provided with an optical path entrance and an optical path exit, and a single or multiple optical fiber loops are embedded in a hollow channel of the connecting rod;
the light source and the photosensor are connected with the optical signal processor, the light source is arranged at the optical path entrance, and the photosensor is arranged at the optical path exit;
light emitted by the light source enters the optical fiber loop through the optical path entrance and is transmitted to the photosensor through the optical path exit; and
the optical signal processor processes optical signals of the light source and the photosensor, and converts the optical signals into deformation signals of the robot network structure to realize the sensing function.

* * * * *